US008945787B2

(12) United States Patent
Asano et al.

(10) Patent No.: US 8,945,787 B2
(45) Date of Patent: Feb. 3, 2015

(54) FUEL-USING SYSTEM COMPRISING ELECTROMAGNETIC FORCE ADJUSTING UNIT

(71) Applicant: Honda Motor Co., Ltd., Tokyo (JP)

(72) Inventors: Saneto Asano, Wako (JP); Koichi Takaku, Wako (JP); Taneaki Miura, Wako (JP); Koichi Kato, Wako (JP); Hiroyasu Ozaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 170 days.

(21) Appl. No.: 13/716,618

(22) Filed: Dec. 17, 2012

(65) Prior Publication Data
US 2013/0164648 A1 Jun. 27, 2013

(30) Foreign Application Priority Data

Dec. 19, 2011 (JP) .................................. 2011-277145
Nov. 30, 2012 (JP) .................................. 2012-263013

(51) Int. Cl.
*H01M 8/02* (2006.01)
*H01M 8/04* (2006.01)
*B60K 6/00* (2006.01)

(52) U.S. Cl.
CPC ...... *H01M 8/04388* (2013.01); *H01M 8/04753* (2013.01); *Y02E 60/50* (2013.01); *H01M 2250/20* (2013.01); *Y02E 60/324* (2013.01); *Y02T 90/32* (2013.01)
USPC .......................................... 429/444; 429/513

(58) Field of Classification Search
USPC ............ 429/432, 434, 444, 513; 122/40, 412; 180/65.1
See application file for complete search history.

(56) References Cited

U.S. PATENT DOCUMENTS

2002/0170504 A1* 11/2002 Kasahara et al. ................ 122/40
2007/0202367 A1* 8/2007 Yoshida .......................... 429/13
2009/0035612 A1* 2/2009 Suematsu et al. ............... 429/13

FOREIGN PATENT DOCUMENTS

JP 2007-035445 A 2/2007

OTHER PUBLICATIONS

"Pulse-width modulation", Oct. 2000. Obtained online on Jul. 5, 2014 from: http://fab.cba.mit.edu/classes/MIT/961.04/topics/pwm.pdf.*

* cited by examiner

*Primary Examiner* — Kenneth Douyette
(74) *Attorney, Agent, or Firm* — Squire Patton Boggs (US) LLP

(57) ABSTRACT

An electromagnetic main stop valve which is opened by an electromagnetic force of a solenoid with energization of a valve body in a valve-closing direction by energizing unit is provided in a hydrogen tank. A current sensor and the accelerator opening-degree sensor for detecting a use gas flow rate in a fuel cell stack are provided. A pressure sensor for detecting a pressure in the hydrogen tank is provided. The control device sequentially sets the electromagnetic force of the solenoid so that a valve-opening amount is such an amount as to supply a use gas flow rate to the fuel cell stack based on detection values of the current sensor or the accelerator opening-degree sensor, and the pressure sensor. When the flow rate of hydrogen gas flowing into a gas supply path increases due to a hydrogen gas leak, the main stop valve is automatically closed.

5 Claims, 6 Drawing Sheets ary of the Invention

FUEL-USING SYSTEM COMPRISING ELECTROMAGNETIC FORCE ADJUSTING UNIT

CROSS-REFERENCE TO RELATED APPLICATION

Priority is claimed on Japanese Patent Application No. 2011-277145, filed on Dec. 19, 2011 and Japanese Patent Application No. 2012-263013, filed on Nov. 30, 2012, the contents of which are incorporated herein by reference.

BACKGROUND

1. Field of the Invention

The present invention relates to a fuel-using system which has a function of cutting off fuel gas supply from a fuel supply source.

2. Description of Related Art

Fuel cell systems are known in which a gas tank filled with high-pressure fuel gas and a fuel-using equipment such as a fuel cell stack are connected to each other using a gas supply path and an electromagnetic shutoff valve (main stop valve) is provided in a base portion of the gas tank (for example, refer to Japanese Unexamined Patent Application, First Publication No. 2007-35445). When the fuel cell system is not used, the shutoff valve used herein is closed by turning off a solenoid, and thus supply of gas from the gas tank is cut off.

In the fuel-using system of this kind, it is necessary to stop the supply of fuel when a fuel gas leak occurs in any one of gas supply paths.

In order to resolve the problem, a fuel-using system is proposed, which is provided with a flow rate detector which detects a flow rate of fuel gas flowing in a gas supply path, recognizes a fuel gas leak when a gas flow rate detected by the flow rate detector is a flow rate which cannot be detected in general use, and closes a shutoff valve of a gas tank.

SUMMARY

However, in the case of the conventional fuel-using system, the detected threshold which is recognized as a value at which a gas leak occurs is required to be a value which is obtained by adding a margin obtained by anticipating signal noise from the surrounding equipments, detection errors, and the like to the maximum flow rate in general use.

Therefore, in the conventional fuel-using system, a situation is considered in which a time period from when a fuel gas leak occurs in a gas supply path to when a shutoff valve is actually closed is increased.

An object of an aspect according to the invention is to provide a fuel-using system in which a time period from when a fuel gas leak occurs in a gas supply path to when a shutoff valve is actually closed can be further reduced.

An aspect according to the invention employs the following configurations in order to solve the problem.

(1) A fuel-using system according to an aspect of the present invention includes: a fuel-using equipment which uses fuel gas; a fuel supply source which supplies fuel gas to the fuel-using equipment; a gas supply path which connects the fuel supply source with the fuel-using equipment; an electromagnetic shutoff valve which is provided in the fuel supply source or a part adjacent to the fuel supply source of the gas supply path, and is opened by an electromagnetic force of a solenoid with energization of a valve body in a valve-closing direction by an energizing unit; a pressure reducing valve which is provided on the downstream side of the shutoff valve and reduces a pressure of the fuel gas passed through the shutoff valve from the fuel supply source; an use gas flow rate detecting unit which detects a flow rate of the fuel gas relating to use of the fuel-using equipment; a gas pressure detecting unit which detects a pressure of the fuel gas on the upstream side of the pressure reducing valve; and an electromagnetic force adjusting unit which sequentially sets the electromagnetic force of the solenoid of the shutoff valve so that a valve-opening amount is such an amount as to supply a use gas flow rate to the fuel-using equipment based on detection values of the use gas flow rate detecting unit and the gas pressure detecting unit.

Accordingly, the electromagnetic force of the solenoid of the shutoff valve is sequentially set so that a valve-opening amount is such an amount as to supply a use gas flow rate to the fuel-using equipment based on the gas flow rate relating to use of the fuel-using equipment and the pressure of the fuel gas on the upstream side of the shutoff valve. In this state, when a fuel gas leak occurs in the gas supply path, the gas flow rate flowing into the gas supply path becomes greater than the use gas flow rate, and the valve open state cannot be maintained with the electromagnetic force of the solenoid set based on the use gas flow rate and the gas pressure. As a result, the shutoff valve is automatically closed with a force of the energizing unit. In addition, when the pressure of the fuel gas on the upstream side of the shutoff valve is reduced, the loss of pressure in the shutoff valve increases in accordance with the reduction, but the increase in loss of pressure is corrected so that the valve-opening amount increases in the setting of the electromagnetic force by the electromagnetic force adjusting unit.

(2) In the aspect of (1), the use gas flow rate detecting unit may be provided with at least one of a required gas flow rate detecting unit which detects a flow rate of fuel gas required for the fuel-using equipment and a consumption gas flow rate detecting unit which detects a flow rate of fuel gas actually used in the fuel-using equipment, and the electromagnetic force adjusting unit may sequentially set the electromagnetic force of the solenoid of the shutoff valve based on a detection value of any one of the required gas flow rate detecting unit and the consumption gas flow rate detecting unit and a detection value of the gas pressure detecting unit.

(3) In the aspect of (1) or (2), the electromagnetic force adjusting unit may store, in advance, a map in which an appropriate current value of the solenoid corresponding to the detection values of the use gas flow rate detecting unit and the gas pressure detecting unit is determined, and output a current corresponding to the map to the solenoid.

(4) In any of aspects (1) to (3), the electromagnetic force of the solenoid which is set by the electromagnetic force adjusting unit may be a total electromagnetic force which is obtained by adding a margin to a minimum electromagnetic force with which a use gas flow rate can be supplied to the fuel-using equipment.

(5) Any of aspects (1) to (4) may be installed and used in a vehicle.

According to the aspects, the electromagnetic force of the solenoid of the shutoff valve is sequentially set so that a valve-opening amount is such an amount as to supply a use gas flow rate to the fuel-using equipment based on a gas flow rate relating to use of the fuel-using equipment and a pressure of the fuel gas on the upstream side of the pressure reducing valve. Therefore, when a fuel gas leak occurs in the gas supply path and the flow rate of fuel gas flowing actually into the gas supply path exceeds that set in the electromagnetic force adjusting unit, the shutoff valve can be rapidly and automatically closed.

Therefore, according to the aspects, in most cases, when a fuel gas leak occurs in the gas supply path, the shutoff valve is closed before the flow rate of the fuel gas flowing in the gas supply path greatly exceeds the maximum flow rate in general use, and thus a time to actually close the shutoff valve can be reduced.

In addition, the flow rate of the fuel gas relating to use of the fuel-using equipment includes a flow rate of the fuel gas, which will be used depending on request or has been required and used, in the fuel-using equipment.

According to the aspect of (3), a map in which an appropriate current value of the solenoid corresponding to the detection values of the use gas flow rate detecting unit and the gas pressure detecting unit is determined is stored in advance, and a current corresponding to the map is sequentially output to the solenoid of the shutoff valve. Therefore, in addition to the above-described reduction of time, the electromagnetic force of the shutoff valve to the gas supply path can be always appropriately and easily set.

According to the aspect of (4), a total electromagnetic force which is obtained by adding a margin to a minimum electromagnetic force with which a use gas flow rate can be supplied to the fuel-using equipment is an electromagnetic force which is set by the electromagnetic force adjusting unit. Therefore, in addition to the above-described reduction of time, malfunction of the shutoff valve in a situation in which no leak occurs in the gas supply path can be prevented.

According to the aspect of (5), the fuel-using system is employed as a fuel-using system which is installed and used in a vehicle. Therefore, even when it is used under difficult circumstances in which signal noise is caused often from auxiliary equipments such as pumps and valves, the shutoff valve can be rapidly closed at the time of occurrence of a fuel gas leak.

DESCRIPTION OF THE EMBODIMENT

Hereinafter, an embodiment according to the invention will be described based on the drawings.

Figure 1:
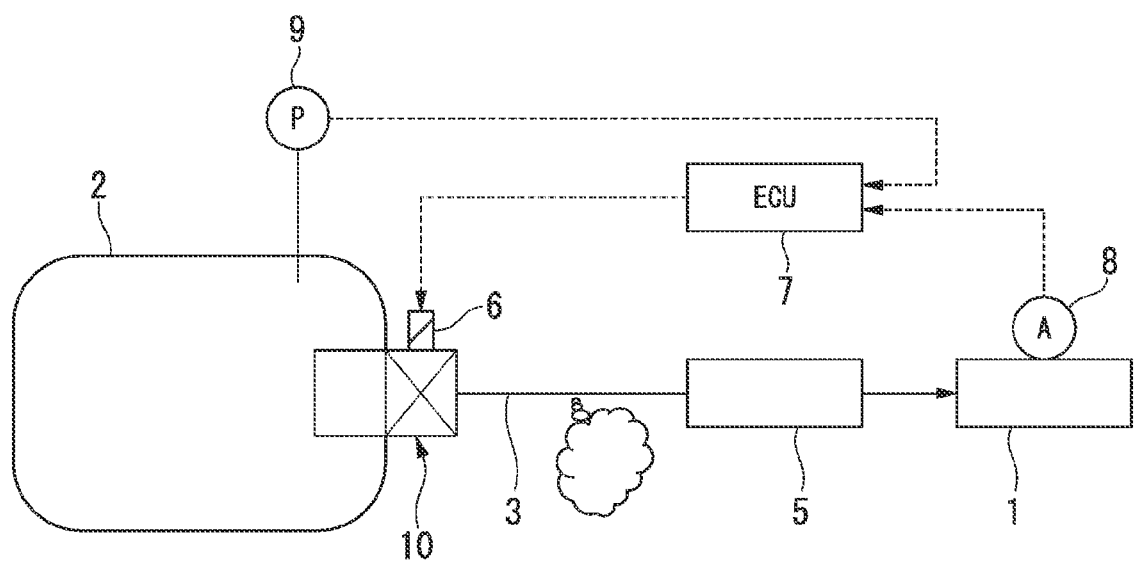
FIG. 1 is a diagram schematically showing a configuration of a fuel-using system according to an embodiment of the invention.

FIG. 1 is a diagram schematically showing a configuration of a fuel cell system (fuel-using system) which is installed in a vehicle. In FIG. 1, the reference number 1 (fuel-using equipment) represents a fuel cell stack (fuel cell) which is supplied with hydrogen as a fuel and oxygen as an oxidant and generates power. The fuel cell stack 1 is, for example, a Polymer Electrolyte Fuel Cell (PEFC), and has a configuration in which a plurality of single cells, in which a Membrane Electrode Assembly (MEA) is sandwiched between separators (not shown), are laminated. The fuel cell stack 1 constitutes a fuel-using equipment in this embodiment.

The fuel cell stack 1 is supplied with hydrogen gas from a hydrogen tank 2 (fuel supply source) storing high-pressure hydrogen via a gas supply path 3, and supplied with air including oxygen via an air supply device (not shown).

The hydrogen tank 2 has a main stop valve 10 (shutoff valve) attached thereto as an electromagnetic shutoff valve which supplies gas to the gas supply path 3 or cuts off a gas supply. The reference number 5 in FIG. 1 represents a pressure reducing valve, which is provided in the middle of the gas supply path 3, for reducing the pressure of high-pressure hydrogen gas discharged from the hydrogen tank 2 to a predetermined pressure.

As will be described later in detail, the main stop valve 10 has a solenoid 6 for performing a valve-opening operation, and a current to be carried to the solenoid 6 is controlled by a control device 7 (electromagnetic force adjusting unit).

The fuel cell stack 1 is provided with a current sensor 8 (consumption gas flow rate detecting unit, use gas flow rate detecting unit) which detects a generated current, and the hydrogen tank 2 is provided with a pressure sensor 9 (gas pressure detecting unit) which detects an internal pressure. Detection signals detected by the current sensor 8 and the pressure sensor are input to the control device 7, and the control device 7 controls a current which is carried to the solenoid 6 so as to obtain an electromagnetic force according to the detection signals. The control by the control device 7 will be described later in detail.

Figure 2:
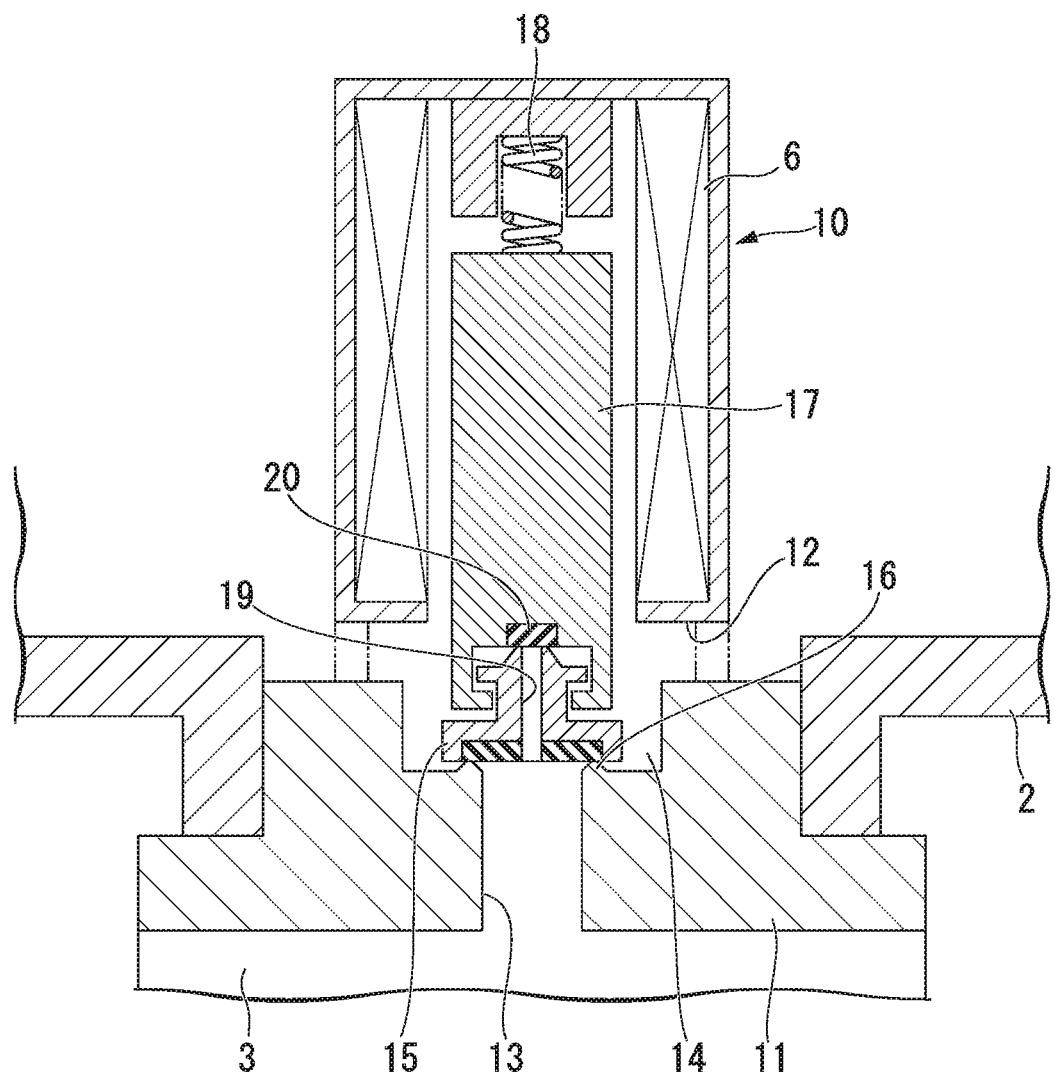
FIG. 2 is a cross-sectional view of a shutoff valve (main stop valve) which is used in the fuel-using system.
Figure 3:
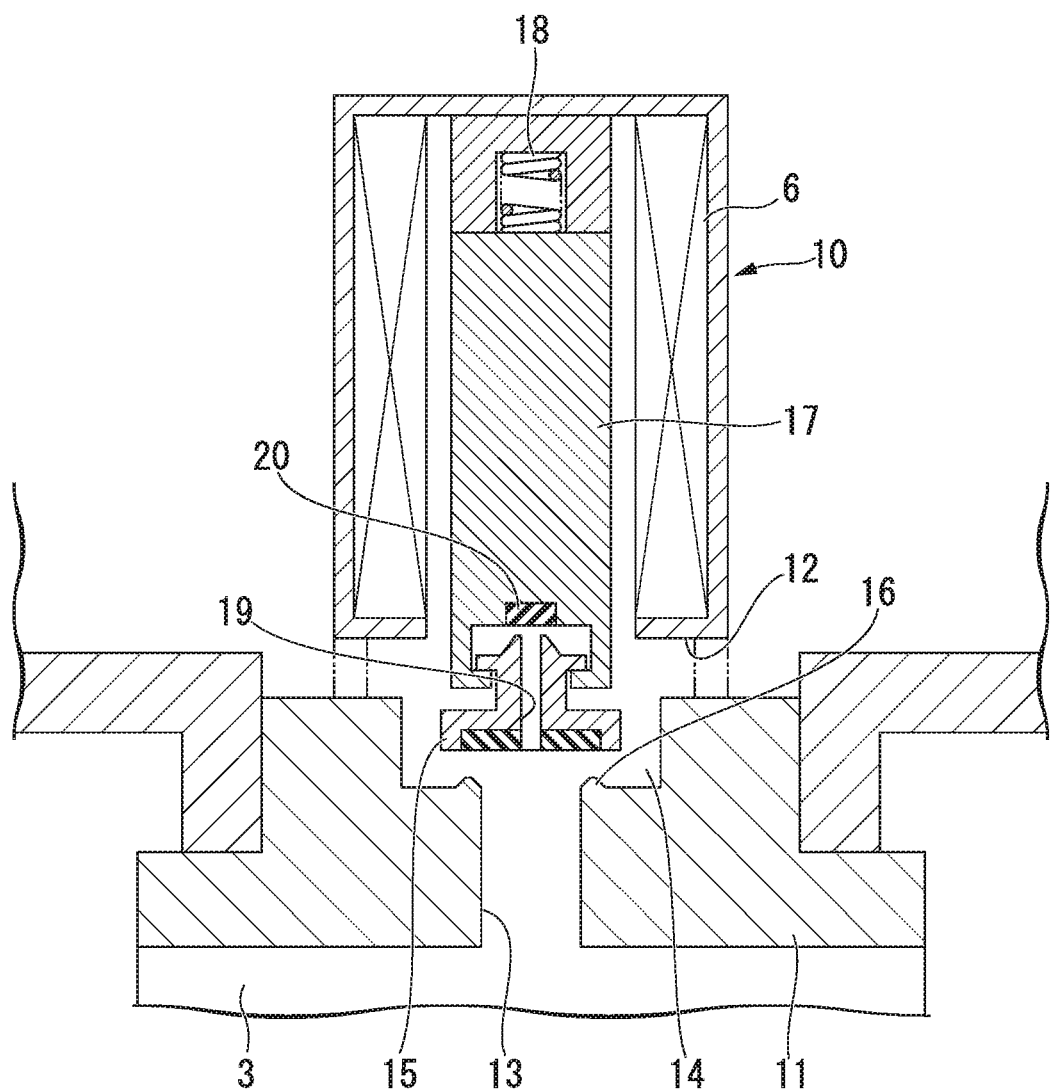
FIG. 3 is a cross-sectional view of the shutoff valve (main stop valve) which is used in the fuel-using system.

FIGS. 2 and 3 are diagrams showing the structure of the main stop valve 10 in detail. FIG. 2 shows a valve open state, and FIG. 3 shows a valve closed state.

The main stop valve 10 is constituted by a kick pilot-type electromagnetic valve, and a valve body 11 is attached to an opening portion of the hydrogen tank 2 to also serve as a sealing plug. The valve body 11 is provided with an introduction path 12 communicating with the inside of the hydrogen tank 2 and a discharge path 13 communicating with the gas supply path 3 which is outside the hydrogen tank 2. In addition, a valve accommodating chamber 14 is provided between the introduction path 12 and the discharge path 13 in the valve body 11, so a valve main body 15 (valve body) which opens or closes an end portion of the discharge path 13 is accommodated in the valve accommodating chamber 14 so as to be freely advanced or retracted. The reference number 16 in the drawings represents a main valve seat from which the valve main body 15 (valve) is separated or toward which the valve main body 15 moves.

The valve main body 15 is held with a minute looseness in an axial direction with respect to a plunger 17 made of a magnetic material, and the plunger 17 is energized by a spring 18 (energizing unit) in a direction in which the valve main body 15 is brought into contact with the main valve seat 16. In addition, a pilot hole 19 is provided in an axial center portion of the valve main body 15 to allow the introduction path 12 to communicate with the discharge path 13. As shown in FIG. 2, when the valve main body 15 is pressed against the main valve seat 16 by the spring 18, an end portion of the pilot hole 19 is brought into contact with a pilot valve seat 20 provided in the plunger 17, and thus the inside is blocked.

In addition, the solenoid 6 is disposed to surround the plunger 17 to retract the plunger 17 against the force of the spring 18 through excitation by supply of a predetermined current.

In the main stop valve 10, when the solenoid 6 is not excited, the valve main body 15 is brought into contact with the main valve seat 16 and the pilot hole 19 is brought into contact with the pilot valve seat 20 as shown in FIG. 2. At this time, the main stop valve 10 completely cuts off supply of hydrogen gas from the hydrogen tank 2 to the gas supply path 3.

In the main stop valve 10, when the solenoid 6 is excited in this state, the plunger 17 is slightly retracted within a play range with respect to the valve main body 15, and at this time, the pilot hole 19 is opened and a difference in pressure between the introduction path 12 and the discharge path 13 is reduced. Thereafter, when the solenoid 6 is further excited, the plunger 17 directly retracts the valve main body 15 itself to separate the valve main body 15 from the main valve seat 16 (to open the valve) as shown in FIG. 3. Accordingly, the introduction path 12 and the discharge path 13 completely communicate with each other, and hydrogen gas in the hydrogen tank 2 is supplied to the gas supply path 3.

Here, the control of the solenoid 6 by the control device 7 will be described.

In the fuel cell system, the current (electromagnetic force) which is carried to the solenoid 6 is not constant and is sequentially set so that a valve-opening amount of the main stop valve 10 is such an amount as to actually supply a use gas flow rate to the fuel cell stack 1 in accordance with a gas flow rate of the hydrogen gas necessary for the fuel cell stack 1 and a pressure of the hydrogen gas in the hydrogen tank 2.

Specifically, for example, a map in which an appropriate current value of the solenoid 6 corresponding to a use gas flow rate of the fuel cell stack 1 and an internal pressure of the hydrogen tank 2 is determined is stored in a memory (storing unit) in advance, and an appropriate current value of the solenoid 6 corresponding to a detection value of the current sensor 8 (the use gas flow rate can be calculated using this current value) and a detection value of the pressure sensor 9 is sequentially set with reference to the above-described map.

In addition, in the fuel cell system, the appropriate current value of the solenoid 6 which is stored in the map is set in consideration of the following two items (a) and (b).

Figure 4:
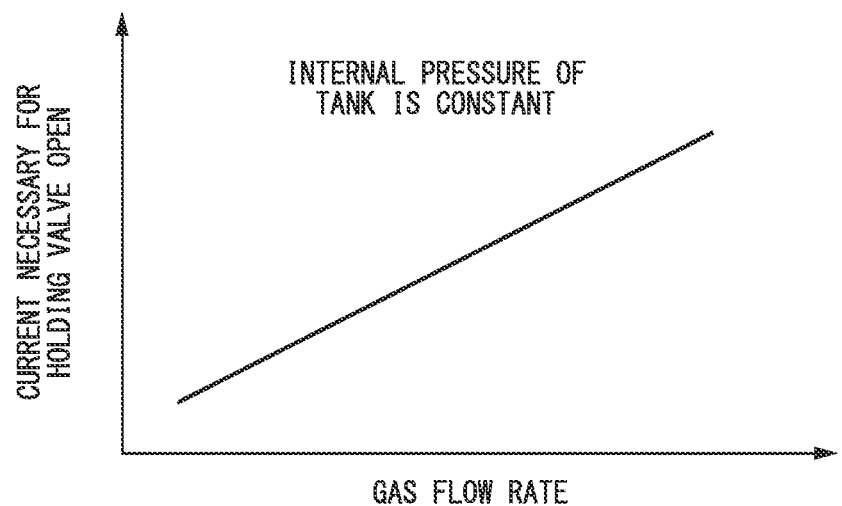
FIG. 4 is a diagram showing the relationship between a gas flow rate in the fuel-using system and a current which is carried to the shutoff valve (main stop valve).

(a) When the internal pressure of the hydrogen tank 2 is constant, the greater the use gas flow rate, the greater the valve-opening amount of the main stop valve 10 to be adjusted as shown in the drawing of FIG. 4, and the value of a current which is carried to the solenoid 6, which is necessary for holding the valve open, is required to be increased substantially proportionally.

Figure 5:
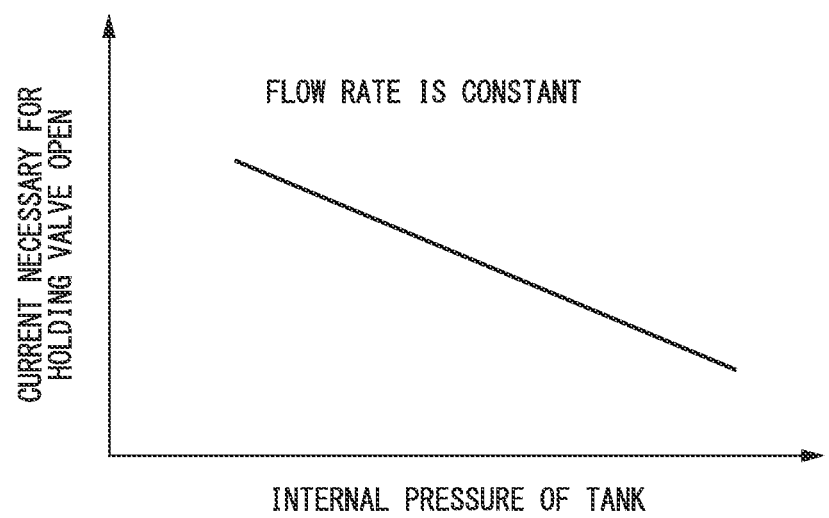
FIG. 5 is a diagram showing the relationship between an internal pressure of a tank in the fuel-using system and a current which is carried to the shutoff valve (main stop valve).

(b) When the use gas flow rate in the fuel cell stack 1 is constant, the less the internal pressure of the hydrogen tank 2, the greater the valve-opening amount of the main stop valve 10 to be adjusted as shown in the drawing of FIG. 5, and the value of a current which is carried to the solenoid 6, which is necessary for holding the valve open, is required to be increased substantially proportionally.

For example, as shown in the following Table 1, a correspondence table (map) of the appropriate current value of the solenoid 6 corresponding to a use gas flow rate and an internal pressure of the hydrogen tank 2 can be made in consideration of the above-described two items (a) and (b).

In the map which is actually used, a total current value (total electromagnetic force) which is obtained by adding a margin such as signal noise and errors to the minimum current value (minimum electromagnetic force) at which a use gas flow rate can be supplied to the fuel cell stack 1 is used as a set current value (set electromagnetic force).

TABLE 1

| | Valve-Opening Holding Current [A] | | | |
|---|---|---|---|---|
| | | Internal Pressure of Tank (MPa) | | |
| | | 10 | 35 | 70 |
| Flow Rate (NL/min) | 100 | 3 | 2 | 1 |
| | 500 | 4 | 3 | 2 |
| | 1000 | 5 | 4 | 3 |

(Including a margin obtained by anticipating noise, sensor errors, and the like)

Figure 6:
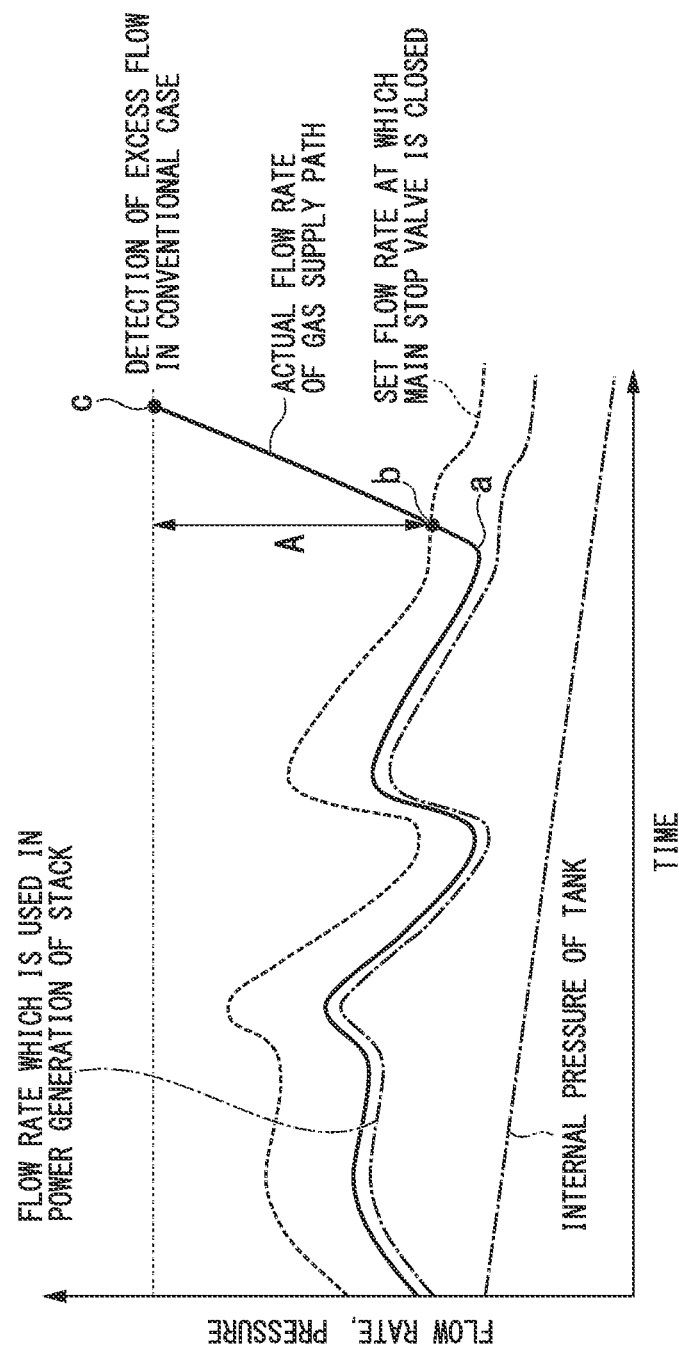
FIG. 6 is a characteristic diagram showing a use gas flow rate in a fuel-using equipment in the fuel-using system, a residual pressure of the tank, a flow rate of gas which actually flows in a gas supply path, and a time at which the shutoff valve (main stop valve) is actually closed.

FIG. 6 is a diagram showing a use gas flow rate which is used in the power generation of the fuel cell stack 1 in the fuel cell system of this embodiment, an internal pressure of the hydrogen tank 2, a flow rate of hydrogen gas which actually flows in the gas supply path 3, a set gas flow rate at which the main stop valve 10 is closed, and a time at which the main stop valve 10 is actually closed when a hydrogen gas leak occurs.

As shown in FIG. 6, in the case of the fuel cell system, the set gas flow rate at which the main stop valve 10 is closed changes, substantially following a change in gas flow rate using in the fuel cell stack 1. The set gas flow rate at which the main stop valve 10 is closed corrects a change in gas pressure in the hydrogen tank 2.

In the fuel cell system, when a hydrogen gas leak does not occur in the gas supply path 3, the gas flow rate flowing in the gas supply path 3 does not exceed the set gas flow rate at which the main stop valve 10 is closed, and thus the main stop valve 10 is maintained in a valve open state.

In addition, when a hydrogen gas leak from the gas supply path 3 occurs at a time point a in FIG. 6 during the operation of the fuel cell system, the flow rate of hydrogen gas flowing into the gas supply path 3 increases. When the flow rate of hydrogen gas flowing into the gas supply path 3 at a time point b in FIG. 6 exceeds the set gas flow rate at which the main stop valve 10 is closed, the main stop valve 10 is automatically closed.

c in FIG. 6 represents a time point at which the main stop valve 10 is closed when the flow rate of fuel gas flowing in the gas supply path 3 exceeds a total flow rate obtained by adding a margin to the maximum flow rate in general use and the main stop valve 10 is closed (in the case of the conventional technique). In addition, A in FIG. 6 represents a difference in leakage amount of hydrogen gas between this embodiment and a comparative example.

As described above, in the fuel cell system, the electromagnetic force (current value of the solenoid 6) of the main stop valve 10 is sequentially set so that a valve-opening amount at which a use gas flow rate in the fuel cell stack 1 can be supplied is achieved based on the gas flow rate using in the fuel cell stack 1 and the internal pressure in the hydrogen tank 2. Accordingly, when a hydrogen gas leak occurs in the gas supply path 3, the main stop valve 10 can be automatically closed early before the flow rate of the hydrogen gas flowing in the gas supply path 3 exceeds the maximum flow rate in general use.

In addition, in the fuel cell system of this embodiment, a map in which an appropriate current value of the solenoid 6 corresponding to a detection value (use gas flow rate of the fuel cell stack 1) of the current sensor 8 and a detection value of the pressure sensor 9 is determined is stored in advance, and the current corresponding to the map is sequentially output to the solenoid 6 of the main stop valve 10. Accordingly, the current which is output to the solenoid 6 of the main stop valve 10 can be always appropriately and easily set.

Furthermore, in the fuel cell system of this embodiment, a total current value which is obtained by adding a margin such as signal noise and errors to the minimum current value at which a use gas flow rate can be supplied to the fuel cell stack 1 is used as a set current value. Accordingly, in a situation in which a hydrogen gas leak does not occur in the gas supply path 3, a wrong valve-closing operation of the main stop valve 10 can be prevented from occurring.

In addition, the fuel cell system is not limited to being installed in vehicles. Particularly, however, it is effective that the fuel cell system be installed and used in a vehicle because, even when it is used under difficult circumstances in which signal noise is caused often from vehicle-installed auxiliary equipments such as pumps and valves, the main stop valve 10 can be rapidly closed at the time of occurrence of a hydrogen gas leak.

Figure 7:
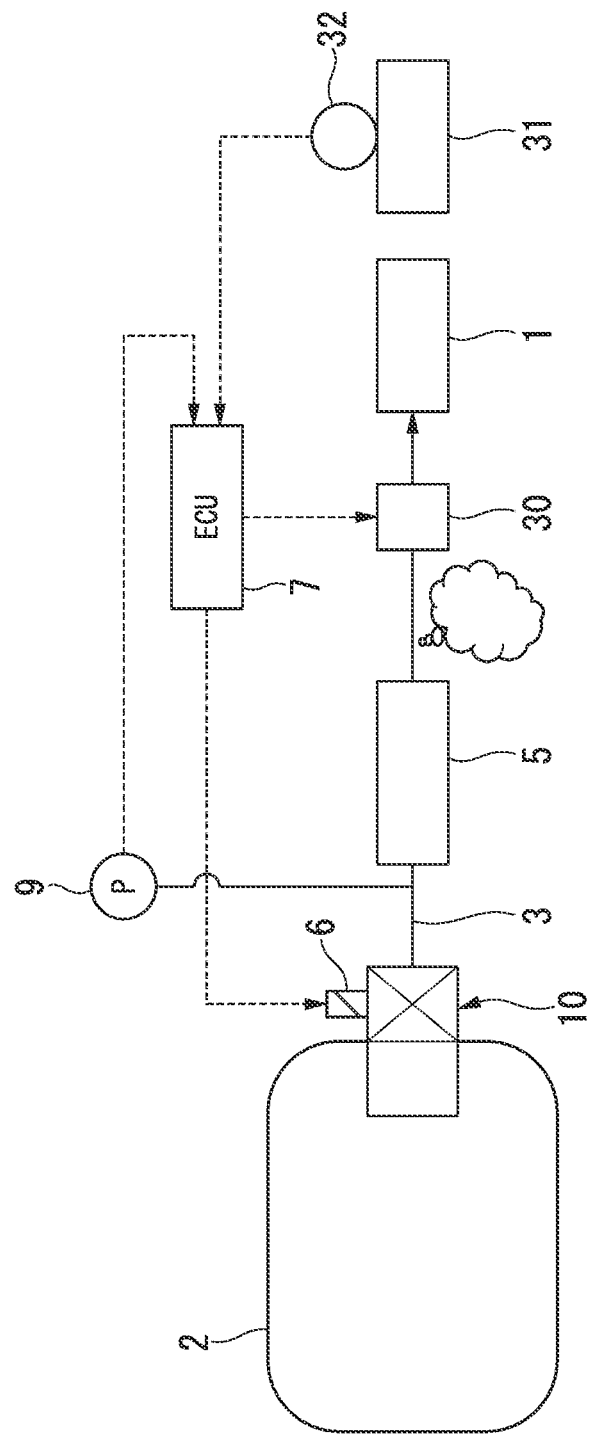
FIG. 7 is a diagram schematically showing a configuration of a fuel-using system according to another embodiment of the invention.

Next, more preferable embodiment of the invention shown in FIG. 7 will be described.

A fuel-using system of this embodiment is a fuel cell system which is installed in a vehicle as in the above-described embodiment. The fuel cell system is provided with a hydrogen tank 2 as a fuel supply source, a main stop valve 10 which is provided in the hydrogen tank 2 to supply gas to a gas supply path 3 or cut off a gas supply, a pressure reducing valve 5 which reduces the pressure of high-pressure hydrogen gas discharged from the hydrogen tank 2 through the main stop valve 10 to a predetermined pressure, a fuel cell stack 1 as a fuel-using equipment, a control device 7 (electromagnetic force adjusting unit) which controls a current which is carried to a solenoid 6 of the main stop valve 10, and an air supply device (not shown) which supplies air including oxygen to the fuel cell stack 1, as in the above-described embodiment.

In addition, an injector 30 (flow rate adjusting valve) is mounted in the gas supply path 3 between the pressure reducing valve 5 and the fuel cell stack 1 to adjust the supply gas flow rate to the fuel cell stack 1. The injector 30 is controlled by the control device 7. The control device 7 receives an opening-degree signal of an accelerator pedal 31 from an accelerator opening-degree sensor 32 (required gas flow rate detecting unit, use gas flow rate detecting unit), and controls an ejection time of the injector 30 in accordance with the opening-degree signal. That is, the control device 7 increases or reduces the supply gas flow rate to the fuel cell stack 1 in accordance with an amount of stepping-on the accelerator pedal 31 by an operator.

In addition, in the fuel-using system of this embodiment, the pressure sensor 9 is provided not on part of the hydrogen tank 2 but on the gas supply path 3 between the main stop valve 10 and the reducing valve 5. When the main stop valve 10 is opened, a pressure within the gas supply path 3 on the upstream side of the reducing valve 5 is substantially same as that within the hydrogen tank 2, thus the pressure sensor 9 in the fuel-using system of this embodiment can detect the pressure within the hydrogen tank 2.

In the case of this embodiment, the control device 7 sequentially sets a valve-opening amount of the main stop valve 10 using a detection value of the accelerator opening-degree sensor 32 and a detection value of a pressure sensor 9. Specifically, for example, a map in which an appropriate current value of the solenoid 6 corresponding to a required gas flow rate and an internal pressure of the hydrogen tank 2 is determined is stored in a memory (storing unit) in advance, and an appropriate current value of the solenoid 6 corresponding to a detection value of the accelerator opening-degree sensor 32 and a detection value of the pressure sensor 9 is sequentially set with reference to the above-described map.

In the fuel cell system of the above-described embodiment, the flow rate of hydrogen gas used actually in the fuel cell stack 1 is detected by the current sensor 8 and the electromagnetic force of the solenoid 6 of the main stop valve 10 is sequentially set based on the above detection value and the internal pressure of the hydrogen tank 2. However, in the fuel cell system of this embodiment, the flow rate of hydrogen gas required for the fuel cell stack 1 is detected by the accelerator opening-degree sensor 32 and the electromagnetic force of the solenoid 6 of the main stop valve 10 is sequentially set based on the above detection value and the internal pressure of the hydrogen tank 2.

In the fuel cell systems of both of the embodiments, there is a difference between the feedback control (control using the flow rate of actually consumed hydrogen gas) and the feedforward control (control using an indication value of a required hydrogen gas flow rate), but this embodiment can also obtain almost the same effect as the above-described embodiment.

The invention is not limited to only the above-described embodiments, and various design modifications can be made without departing from the gist thereof. For example, in the above-described embodiments, the electromagnetic shutoff valve (main stop valve 10) is provided integrally with the hydrogen tank 2, but the shutoff valve may be provided separately in the vicinity of the hydrogen tank 2.

In addition, in the above-described embodiments, an appropriate current value of the solenoid 6 corresponding to a detection value (consumption gas flow rate of the fuel cell stack 1) of the current sensor 8 and a detection value of the pressure sensor 9, and an appropriate current value of the solenoid 6 corresponding to a detection value (required gas flow rate) of the accelerator opening-degree sensor 32 and a detection value of the pressure sensor 9, are stored in advance in the form of a map, but the appropriate current value of the solenoid 6 may be obtained by calculation in each case.

Furthermore, in the above-described embodiments, the hydrogen tank 2 is used as a fuel supply source, but the fuel supply source may be a fuel reforming device.

In addition, the fuel-using system according to the invention is not limited to the fuel cell system and may be a system other than a fuel cell, such as an internal combustion engine system using hydrogen gas as fuel, as long as the system uses fuel gas such as hydrogen gas.

What is claimed is:

1. A fuel-using system comprising:
a fuel-using equipment which uses fuel gas;
a fuel supply source which supplies fuel gas to the fuel-using equipment;
a gas supply path which connects the fuel supply source with the fuel-using equipment;
an electromagnetic shutoff valve which is provided in the fuel supply source or a part adjacent to the fuel supply source of the gas supply path, and is opened by an electromagnetic force of a solenoid with energization of a valve body in a valve-closing direction by an energizing unit, wherein the electromagnetic shutoff valve comprises a main valve body located above a main valve seat, and a discharge path which leads into the gas supply path, and wherein the discharge path is configured to receive fuel from the fuel supply source that flows around the main valve body, through the main valve seat, and into the discharge path;

a pressure reducing valve which is provided on the downstream side of the shutoff valve and reduces a pressure of the fuel gas passed through the shutoff valve from the fuel supply source;

an use gas flow rate detecting unit which detects a flow rate of the fuel gas relating to use of the fuel-using equipment;

a gas pressure detecting unit which detects a pressure of the fuel gas on the upstream side of the pressure reducing valve; and an electromagnetic force adjusting unit which sequentially sets the electromagnetic force of the solenoid of the shutoff valve so that a valve-opening amount is such an amount as to supply a use gas flow rate to the fuel-using equipment based on detection values of the use gas flow rate detecting unit and the gas pressure detecting unit.

2. The fuel-using system according to claim 1,
wherein the use gas flow rate detecting unit is provided with at least one of a required gas flow rate detecting unit which detects a flow rate of fuel gas required for the fuel-using equipment and a consumption gas flow rate detecting unit which detects a flow rate of fuel gas actually used in the fuel-using equipment, and
the electromagnetic force adjusting unit sequentially sets the electromagnetic force of the solenoid of the shutoff valve based on a detection value of any one of the required gas flow rate detecting unit and the consumption gas flow rate detecting unit and a detection value of the gas pressure detecting unit.

3. The fuel-using system according to claim 1,
wherein the electromagnetic force adjusting unit stores, in advance, a map in which an appropriate current value of the solenoid corresponding to the detection values of the use gas flow rate detecting unit and the gas pressure detecting unit is determined, and outputs a current corresponding to the map to the solenoid.

4. The fuel-using system according to claim 1,
wherein the electromagnetic force of the solenoid which is set by the electromagnetic force adjusting unit is a total electromagnetic force which is obtained by adding a margin to a minimum electromagnetic force with which a use gas flow rate is supplied to the fuel-using equipment.

5. The fuel-using system according to claim 1 which is installed and used in a vehicle.

* * * * *